United States Patent
Oh et al.

(10) Patent No.: US 6,541,059 B2
(45) Date of Patent: Apr. 1, 2003

(54) PROCESS OF MAKING INSTANT PASTA WITH IMPROVED COOKING QUALITY

(75) Inventors: Nam H. Oh, Warren, NJ (US); Shiowshuh Sheen, New Providence Boro, NJ (US)

(73) Assignee: Bestfoods, Englewood Cliffs, NJ (US)

( * ) Notice: Subject to any disclaimer, the term of this patent is extended or adjusted under 35 U.S.C. 154(b) by 216 days.

(21) Appl. No.: 09/731,956

(22) Filed: Dec. 7, 2000

(65) Prior Publication Data

US 2002/0146485 A1 Oct. 10, 2002

(51) Int. Cl.⁷ .................................................. A23L 1/162
(52) U.S. Cl. ........................................ 426/557; 426/451
(58) Field of Search ............................... 426/557, 451, 426/496

(56) References Cited

U.S. PATENT DOCUMENTS

| | | |
|---|---|---|
| 2,677,613 A | 5/1954 | Shiah |
| 2,704,723 A | 5/1955 | Poole et al. |
| 3,251,694 A | 5/1966 | Scotland et al. |
| 3,615,677 A | 10/1971 | Scharschmidt |
| 4,044,165 A | 8/1977 | Baumann |
| 4,098,906 A | 7/1978 | Hisaki et al. |
| 4,208,439 A | 6/1980 | Hsu |
| 4,230,735 A | 10/1980 | Yoshida et al. |
| 4,234,617 A | 11/1980 | Sakakibara et al. |
| 4,243,689 A | 1/1981 | Kokeguchi et al. |
| 4,243,690 A | 1/1981 | Murakami et al. |
| 4,251,551 A | 2/1981 | VanHullel et al. |
| 4,271,205 A | 6/1981 | Kaneko et al. |
| 4,346,119 A | 8/1982 | Braibanti et al. |
| 4,359,214 A | 11/1982 | Eldridge |
| 4,368,210 A | 1/1983 | Murakami et al. |
| 4,370,352 A | 1/1983 | Murakami et al. |
| 4,394,397 A | 7/1983 | Lometillo et al. |
| 4,473,593 A | 9/1984 | Sturgeon |
| 4,525,371 A | 6/1985 | Blemlek |
| 4,529,609 A | 7/1985 | Gaehring |
| 4,539,214 A | 9/1985 | Winter et al. |
| 4,540,590 A | 9/1985 | Harada et al. |
| 4,540,592 A | 9/1985 | Myer et al. |
| 4,590,083 A | 5/1986 | Hatsugai et al. |
| 4,783,339 A | 11/1988 | Horner |
| 4,888,193 A | 12/1989 | Konno et al. |
| 4,973,487 A | 11/1990 | Wyss et al. |
| 4,990,349 A | 2/1991 | Chawan et al. |
| 5,063,072 A | 11/1991 | Gillmore et al. |
| 5,108,772 A | 4/1992 | Wilbur |
| 5,114,727 A | 5/1992 | Brimelow et al. |
| 5,122,378 A | 6/1992 | Hauser et al. |
| 5,124,168 A | 6/1992 | McMillan et al. |
| 5,128,166 A | 7/1992 | Babines et al. |
| 5,153,017 A | 10/1992 | Schaaf |
| 5,256,435 A | 10/1993 | Cuperus |
| 5,294,452 A | 3/1994 | De Francisci |
| 5,332,592 A | 7/1994 | Ishigaki et al. |
| 5,500,236 A | 3/1996 | Miller et al. |
| 5,700,512 A | 12/1997 | Desjardins et al. |
| 5,728,418 A | 3/1998 | Hauser et al. |
| 5,972,407 A | * 10/1999 | Hsu ........................... 426/557 |

\* cited by examiner

*Primary Examiner*—Lien Tran

(57) ABSTRACT

A process for making pre-cooked pasta from freshly extruded pasta dough and pastas made by the method. The process involves steaming freshly extruded pasta dough, soaking the steamed dough, removing excess moisture from the surface of the pasta dough and toasting. The desired textural attributes can be achieved by manipulating the processing conditions and the moisture content of the pasta dough. The pre-cooked pasta is particularly suited for hot or boiling water pour-over preparation or microwave cooking.

6 Claims, No Drawings

PROCESS OF MAKING INSTANT PASTA WITH IMPROVED COOKING QUALITY

BACKGROUND OF THE INVENTION

1. Field of the Invention

The present invention concerns processes for making pre-cooked instant pasta and noodles with superior eating quality made from freshly extruded pasta dough and products made by the process. The freshly extruded pasta dough is subjected to a process comprising steaming, soaking in water, removing excess moisture from the surface of the pasta dough, and toasting. The process conditions are dependent upon the shape and size of the pasta or noodle, and the desired texture.

2. Description of Related Art

Presently available instant or quick cooking pasta and noodles are conventionally made by extrusion cooking or cooking subsequent to extrusion by immersion in boiling water and/or steam cooking. Extrusion cooking, however, can result in deterioration of the pasta texture due to the impact of heat and high shear on the protein matrix prior to and during extrusion. When these products are rehydrated, the texture is mushy or soft, not "al dente". The extrusion cooking process is costly, requiring sophisticated equipment and control systems.

U.S. Pat. No. 3,251,694 describes a pre-cooked macaroni wherein the dough is made in a conventional manner and the fresh pasta is said to be completely precooked and dried at 300–700° F. for about 3 to 9 minutes. The product, however, is not completely pre-cooked and is expensive because of high processing costs and is limited to pasta shapes that can be extruded with thin walls and still maintain their shape.

A pasta having a helix shape said to be quick cooking is described in U.S. Pat. No. 5,728,418. The pastas are limited to those having a shape of a helix and the reported density of the pasta, between 0.2 g/cm³ and 0.75 g/cm³, is the bulk density, which is a function of the cylindrical space occupied by the pasta, rather than density based on the volume displacement of the pasta or noodle.

U.S. Pat. No. 3,615,677 concerns a pasta said to be rapid cooking made by an extrusion and drying process wherein corn flour is described as a critical binding ingredient which also masks the harsh bitter flavor of soy materials in the formulation. The product of U.S. Pat. No. 3,615,677 has poor structural integrity, a soft mushy structure and the harsh bitter flavor of soy material is not effectively masked.

A process for preparing instant-cooking alimentary pastes using repetitive vaporization treatments is described in U.S. Pat. No. 4,346,119. U.S. Pat. No. 4,359,214 describes a process for making an unexpanded pasta, said to be rapidly rehydratable, involving subjecting the pasta to dry, superheated steam, in the absence of water at between 102° C. to 140° C. for 7 to 20 minutes such that the pasta comprises an inner core zone in which a substantial amount of the protein remains undenatured and a substantial amount of the starch remains ungelatinized. U.S. Pat. No. 5,256,435 discusses a dried pasta product which is said to be rapidly reconstituted for consumption in which the pasta is pre-cooked with steam while being intermittently sprayed with water at a temperature of 90° C. to 98° C. and a pH of 5.0 to 5.5. A pasta product that is said to be tolerant to exposure to non-boiling water and capable of microwave preparation is described in U.S. Pat. No. 5,063,072.

U.S. Pat. Nos. 4,044,165, 4,394,397 and 4,540,592 involve pasta products wherein combinations of heat and mechanical stress are used during extrusion processes to fully pre-cook the pasta products. The products of these patents suffer from poor textural qualities and lack of "al dente" texture, and are processed using extensive and expensive preparation means.

It was an object of the invention to obtain a process of making a fully pre-cooked pasta product by a method which does not involve extrusion cooking and reduces the time and expense associated with conventional processing methods.

It was a further object of the invention to develop a fully pre-cooked pasta product having faster preparation times and improved textural performance, particularly when prepared by microwave oven cooking or hot or boiling water pour-over.

These objects have been achieved by the process of preparing instant fully precooked pasta which comprises steaming the pasta dough, soaking the steamed pasta dough, removing excess moisture from the surface of the pasta dough and toasting.

All percentages and ratios set forth in this specification are by weight/weight unless designated otherwise.

SUMMARY OF THE INVENTION

The pasta or noodle products of the invention have textural properties and density and porosity imparted by the process which enable the pasta to be prepared by simple hot or boiling water pour-over or microwave cooking, as well as conventional means of stove top cooking in boiling water. Reference to "pasta", "pasta or noodle" and "pasta and noodle", as used in this Specification, includes reference to both pasta and noodle. The process comprises the steps of steaming freshly extruded pasta dough, soaking the steamed pasta dough, removing excess moisture from the surface of the pasta dough and toasting. The degree of expansion and product density of the pasta product can be manipulated through the control of the moisture content of the extruded dough and toasting conditions. The precise processing conditions will vary depending upon the pasta shape, dimensions and desired texture. Any shape of pasta can be made by the process described herein, and the processing conditions can be manipulated to achieve desired quick cook characteristics.

The process provides a fully pre-cooked product, that is a pasta that has fully gelatinized starch, or nearly fully gelatinized starch, and denatured protein, that reduces the cooking time compared to conventionally processed pasta products and other instant pasta products and allows for more rapid rehydration of the pasta without subjecting the product to cooking in boiling water for long time periods. Thus, the pasta is a quick cooking or convenient pasta that can be prepared by any process capable of hydrating and cooking the pasta, including hot or boiling water pour-over and microwave preparation, as well as traditional stove top cooking. The process results in a pasta with unique textural attributes, porosity and density so that the quick cooking pasta of the invention will have the taste and organoleptic aspects of conventional pasta made in boiling water, when prepared by hot or boiling water pour-over or with microwave cooking.

The pasta products can be made from a wide variety of farinaceous materials which allows use of less expensive materials, and the pasta can be made from a wide variety of flours and starches, including wheat, rice, potato, corn and the like. Also, the process steps are relatively fast compared to processes used to make conventional pasta and other quick cook pastas. The process of the invention eliminates the long drying time, which can be up to 6 to 8 hours, associated with conventional pasta manufacture. Thus, a cost saving can be realized with the process, and pastas made by the process as a result of, among other things, the variety of raw materials that can be used and the time, energy and equipment savings associated with the process.

Additionally, the process can be manipulated to produce a pasta product that has a unique crunchy texture. Accordingly, the pasta can be used as or incorporated into a snack food product. A variety of flavors, herbs, spices or other flavoring ingredients can be blended with the pasta dough prior to processing or coated on the surface of the pasta to make a snack food product.

DETAILED DESCRIPTION OF THE INVENTION

Pasta dough is made for the process of the invention with water, wheat flour and other ingredients using known extrusion techniques. Accordingly, the ingredients are combined and hydrated with sufficient water to attain the desired consistency and kneaded to make the dough. The dough can be formed into the desired shape by extrusion through a die plate and then cut into pieces of the desired size. In a preferred embodiment of the present invention, freshly extruded pasta dough, cut into shape, is subject to the processing steps described herein. The freshly extruded pasta dough preferably has a moisture content of from about 15% to about 35%, and the textural qualities of the processed pasta products will be, in part, a function of the moisture content of the extruded dough. The pasta dough may be extruded with no vacuum.

The ingredients of the pasta of the invention comprise wheat flour selected from the group consisting of semolina, farina, durum, hard wheat and soft wheat flours and pasta regrind from wheat based pastas and the like. Alternate flours such as those from rice and corn can be employed in amounts from 0% to about 15% and preferably less than about 10%. Starches from sources such as rice, corn, flour, potato and the like also can be employed in amounts from 0% to about 20%, preferably less then about 15%. Protein sources can be optionally added in amounts from about 0.25% to about 10%, and when they are used, they typically are added in amounts of at least about 0.5% to about 5%. Typical protein sources include wheat gluten, milk protein, soy protein and eggs in any form including whole eggs, egg whites, powdered eggs, powdered egg whites and the like. A variety of natural and artificial flavors, herbs, spices, cheeses and the like also can be employed in amounts from 0% to about 20% and when they are employed they typically are added in amounts of at least about 0.1%.

The instant pre-cooked pasta can be made with a processing combination of steaming, soaking, removing excess moisture from the surface of the pasta dough, and toasting. The processing conditions include steaming for about 1 minute to about 10 minutes, soaking in water for up to about 20 minutes, removing excess moisture from the surface of the pasta dough for up to about 10 minutes, and toasting at about 82° C. to about 177° C. for about 2 to about 30 minutes using a continuous microwave oven and/or forced hot air toaster. These pasta products have improved product texture, porosity, faster preparation times and improved textural tolerance after preparation when prepared by hot or boiling water pour-over or microwave cooking or conventional stove top preparation methods. Processing conditions will vary depending upon pasta shape, dimensions and the desired texture and/or porosity.

Freshly extruded pasta is used for the process, and the freshly extruded pasta product is subjected to the initial steaming step. By "freshly extruded pasta", it is meant pasta dough that has not been subject to physical or chemical process or non-natural drying prior to initiation of the steaming step, and that the pasta undergoes no or minimal starch gelatinization or protein denaturation during the extrusion. The moisture content of freshly extruded pasta products are from about 15% (semi-moist) to about 35% (wet/moist), preferably from about 26% to about 33% moisture and most preferably from about 28% to about 32% moisture. Complete starch gelatinization (reducing starch cook requirements) and changes in the protein matrix, resulting in the development of a less dense, porous internal structure improves hydration rate and shortens cook time which is particularly suited for hot or boiling water pour-over or microwave preparation. Control of density and texture is also linked to the control of the extruded dough moisture level and toasting conditions.

The degree of expansion and resulting pasta product density can be manipulated during the process steps described herein to deliver the desired texture and hydration rate needed for shorter preparation time. Product density can be controlled from about 0.700 g/cc to 1.100 g/cc. The preferred range of density is generally from about 0.800 g/cc to about 1.000 g/cc. In practice, the preferred range of density is dependent on specific application for which the pasta will be used. Other pre-cooked pasta products and conventionally produced pasta have densities above 1.100 g/cc.

The degree of expansion and density also affects the porosity of pasta product. The internal structure of the pasta having a density of about 0.700 g/cc to 1.100 g/cc is porous having channels or inlets for water to seep into during preparation which is associated with the quick cook times of the pasta for hot or boiling water pour-over and microwave preparation methods. For example, the fully pre-cooked pasta made by the process described herein can be prepared in about 4 minutes whereas other instant pre-cooked pastas require about 5 minutes microwave preparation time.

The first step of the process is the steaming of the freshly extruded pasta dough, which may optionally have been cut into desired shapes prior to the steaming step. The pasta dough is steamed for a period of about 1 minute to about 10 minutes, preferably about 3 minutes to about 5 minutes at a temperature of from about 88° C. to about 104° C., preferably from about 93° C. to about 100° C.

The steaming process serves two functions. First, the steam precooks the starch (that is partially gelatinizes the starch), and denatures the protein on the surface of the extruded pasta dough. This significantly strengthens the protein-starch matrix, allowing the pasta dough to withstand the abusive processing conditions during the subsequent soaking, removal of excess moisture from the surface of the pasta dough and toasting steps. Second, the steaming process modifies attributes of the pasta dough which evolve into attributes of the final pasta product after all of the steps, and allows us to design pastas having specific product attributes. These attributes include increased product integrity, increased resistance to "checking or cracking", reduced starch loss, increased pasta firmness and increased tolerance to over cooking. These attributes are important to the final pasta product as they improve product performance in convenience oriented preparation methods, particularly hot or boiling water pour-over preparation methods, as well as microwave cooking and quick cook stove top preparation.

Steaming can be achieved by injecting food grade steam into a steamer or into the same apparatus that otherwise would be used for toasting. Suitable industrial steamers for continuous processing are generally commercially available such as those from Bühler, Wenger or Pavan.

After steaming, the pasta is soaked in water for a period of up to about 20 minutes for ambient temperature water, it being understood that soaking time is a function of water temperature. The preferred soaking time is for about 1 minute to about 10 minutes. The soaking step allows water to be absorbed into the steamed pasta dough, and thereby increase the moisture content. Soaking the steamed pasta dough in water at a temperature of about 15° C. to about 33° C. is most preferred for water absorption. The moisture content of the pasta dough after soaking should be between about 35% and about 55%.

The toasting step achieves nearly full cook (full gelatinization) of the pasta dough, that is up to 100%, preferably from about 95% to 100%, of the starch is gelatinized after the toasting step. The moisture content absorbed into the dough during the soaking process enhances the nearly complete or complete gelatinization of the starch. In order to achieve the desired properties of the pasta product, however, excess moisture must be removed from the surface of the pasta dough after soaking. This can be achieved by any means capable for removing excess moisture, including allowing the pasta to stand at ambient conditions and/or use of forced air and the time required for this step will be dependent upon the amount of excess moisture, shape of the pasta, drying conditions and equipment. Generally, we have found that, at ambient conditions, it will take up to about 10 minutes, preferably from about 1 minute to about 10 minutes, to remove sufficient excess surface moisture, and use of forced air affects the actual time requirements.

The pasta dough is then toasted in a continuous microwave oven and/or hot air toaster at a temperature of about 82° C. to about 177° C. for about 2 minutes to about 30 minutes, preferably about 93° C. to about 149° C. for about 3 minutes to about 20 minutes. The water added to the internal structure of the pasta dough through the soaking step helps to achieve complete cook of the product during the toasting process, which provides for up to 100% starch gelatinization, preferably about 95% to 100%, and nearly complete protein denaturation. Complete pre-cooking of the product during the toasting process is important to the product, particularly when prepared by the hot or boiling water pour-over method to obtain a product with fully cooked texture, e.g the texture associated with conventional pastas cooked by traditional means in boiling water, without any uncooked starchy taste.

Control of density, porosity and texture is directly linked to the control of the toasting conditions employed and the moisture content of the soaked pasta dough. Toasting can be performed in single or multiple zones. Higher toasting temperature in first and subsequent toasting zones increases pasta porosity and decreases pasta density.

The preferred processing temperature range for toasting is from about 93° C. to about 149° C. for from about 3 to about 20 minutes to attain a moisture content of less than about 13%, i.e., from about 2% to about 13%, preferably from about 5% to about 6%. In embodiments where multiple toasting zones are employed, the product leaving the last toasting zone will have a moisture content less than about 13%, preferably less then about 10%, but it is understood that the product may pick up moisture during storage to a maximum of about 13%.

In a preferred embodiment of the invention, toasting is conducted in two, three or more toasting zones as mentioned above. The preferred toasting time and temperature is varied depending upon pasta shape, thickness, porosity and the texture desired. Thicker moist pasta will require longer toasting times and/or higher temperatures.

A multi-zone microwave oven, having from 3 to 5 toasting zones, may be employed in the toasting step. Each separate toasting zone may be used for power levels up to 6 kW of power. The power requirements and number of zones where toasting occurs will depend on the size and configuration of the pasta product. Multi-zone microwave ovens are available from Cober Electronics, Inc., South Norwalk, Conn., USA. Hot air toasters, such as those available from Wolverine Proctor and Schwartz, Horsham, Pa., USA may also be used for the toasting step.

The degree of expansion and resulting pasta product density can be manipulated to deliver the desired texture and hydration rate needed for shorter preparation time. A significant advantage of this invention is in the ability to control the pasta thickness and the degree of porosity and/or density needed to obtain the desired preparation time and texture. Product density is controlled so that the product will have a density from about 0.700 g/cc to 1.100 g/cc. The preferred range of density is generally from about 0.800 g/cc to about 1.000 g/cc. In practice, the preferred range of density is dependent on the specific application for which the pasta will be used. Control of product density is one of the distinguishing characteristics of this invention. Furthermore, the density of the pasta produced by this invention sets it apart from the higher density, more than 1.100 g/cc, of commercially available pre-cooked pasta and conventionally produced pasta. The degree of expansion and product density effects the porosity which provides inlets or channels for water penetration which is pertinent to the quick cook characteristics of the pasta, such as for the pour-over and microwave preparation methods.

Density determinations were made according to the invention using silicone oil according to the following procedure. An 8 ounce jar was preweighed on a top loading balance sensitive to 0.01 grams and precalibrated for volume using Silicone Oil (Fisher Scientific Cat. No. S159-500). 25.0+/−0.5 grams of pasta was accurately weighed into the jar and enough silicone oil at 23° C. temperature was added to just cover the pasta. A thin metal spatula was used to stir the mass to release any trapped air. Addition of silicone oil was resumed until the oil was almost to the rim of the jar. A preweighed flat 4 and ½ inch square, ⅛ inch thick plastic plate containing 24, 1/16 inch holes and one center ¼ inch hole within the area of the top of the jar was placed on top of the jar. It was positioned so that the large hole in the center was close to the center of the jar opening. Silicone oil was again added with a pipette into the center hole until all air was excluded from beneath the plate.

The density of the silicone oil at 23° C. of 0.961 g/cc was divided into the weight required to fill the empty jar to establish the jar volume and separately into the weight of the oil added to fill the jar when it contained the pasta, to establish the volume of the pasta by difference. After the pasta weight was adjusted for its moisture content to obtain the weight on a dry basis, the pasta weight was divided by the determined pasta volume to obtain the pasta density.

Density control according to the invention is achieved by the controlling the toasting time and temperature in the toasting zone, and preferably in two or more separate toasting zones. The pasta is conveyed in a bed through the toaster and the thickness of the bed of pasta can be varied depending upon the toasting conditions as would be apparent to one skilled in the art based on the disclosures herein. The thickness of the bed is generally from about 0.5 centimeters to about 5 centimeters. Toasting temperatures in the toasting zones are kept in a range from about 82° C. to about 177° C., with the preferred range being from about 93° C. to about 149° C.

Air velocity during toasting has been found to be important to drying uniformity and product uniformity. Effective air velocities employed are from about 15 meters per minute to about 243 meters per minute with the preferred range being from about 15 meters per minute to about 152 meters per minute. Airflow velocities are varied depending on the product shape, thickness and the desired final moisture content of the pasta to attain desired product uniformity and rate of moisture loss.

Following toasting, the toasted pasta is removed from the toaster and cooled to ambient temperature by conventional means such as by using a forced air cooler. The extruded dough may be cut into desired shapes either prior to the toasting process or after the toasted pasta has cooled.

The products of the invention are preferably fully pre-cooked, in that there is up to 100% starch gelatinization. Preferably, the products have from about 95% to 100% starch gelatinization. In order to determine the degree of gelatinization of a pasta product, the total heat absorbed during the gelatinization of a weighed portion of pasta in sufficient water is measured by a differential scanning calorimeter (DSC).

To accomplish this, at least 10 grams of the product is finely ground and 10 milligrams of this is weighed into the bottom portion of a special stainless steel capsule which fits in the instrument. The weighing is done on a microbalance accurate to at least 0.01 milligrams. Twenty milligrams of water is then injected into the capsule bottom on top of the pasta and the total weight of the capsule contents is obtained. The lid of the capsule, which is fitted with a neoprene "O" ring, is placed on the capsule bottom as a cover. Pressure is applied to form a hermetic seal which will prevent the loss of moisture during heating. The capsule is placed in the sample well of the DSC instrument chamber and a sealed empty capsule is placed in the reference well. The chamber is uniformly heated at a constant rate and the difference in the heat absorbed by the sample over the blank is determined in joules/gram for a peak in a region of the resulting thermogram near 70° C. This result is subtracted from the value similarly determined for a sample of the raw wheat component (such as semolina or durum wheat) utilized in making the product. Since the two values represent how much heat was required to gelatinize the remaining ungelatinized starch present in the individual samples, the difference expressed as a percent (%) is the level to which the product has already been gelatinized.

Additional ingredients, such as salt, gluten, egg white and gums can be used to further modify texture. These ingredients may be added to the pasta dough at any time during the dough making process.

The addition of up to about 3% salt based on the weight of the farinaceous material (such as wheat, corn, soy flours, semolina, farina and the like) also improves hydration by creating voids within the structure of the pasta and noodles after the salt dissolves during cooking. Highly soluble salts dissolve leaving fine trails or voids in the pasta structure that facilitates water penetration during cooking. For example, a 2% salt level improved preparation time when compared to microwave preparation time without salt.

Manipulating the type, quality and quantity of protein in the extruded dough modifies pasta product performance. The addition of protein sources, such as vital wheat gluten, egg proteins, soy and the like in amounts from about 0.25% to about 10% can be used to modify the pasta product attributes, with the typical range being from about 0.5% to about 5.0%. Protein sources are especially useful when farinaceous materials are utilized that are low in protein content or in instances where the native protein functionality is lacking. Added proteins can be used to modify texture, increase firmness, reduce starch loss, improve tolerance to overcooking and maintain product integrity during rigorous preparation procedures that require frequent stirring.

The method of the invention can be applied to any shape of pasta. Pasta can be made in any short and long shape and may be of conventional or thin wall thickness. Wall thicknesses are chosen as a function of the type of preparation method and preparation time requirements needed.

The pasta products also can be made into a snack food or flavored by incorporating a variety of flavoring agents, selected from the group of natural and artificial flavors, herbs, spices, cheeses and/or other ingredients, which may be added at from about 0.1% to about 20% to impart the desired flavor and appearance. Flavors can be blended with the farinaceous materials prior to extrusion and/or can be coated on the surface. Protein sources are typically used from about 0.5% to about 10.0% with a variety of flavors and/or other ingredients, such as those listed above, (i.e. eggs, cheeses) that may be necessary to achieve desired flavor.

The fully pre-cooked pastas of the invention are particularly useful for convenient type foods, e.g. pastas prepared by hot or boiling water pour-over where the pasta is, in essence, merely rehydrated, and pastas prepared in a microwave. The process parameters can be manipulated so that the pasta will have the textural characteristics of conventionally prepared pasta with faster rehydration, short preparation time, improved cook and textural tolerance. The product texture can be manipulated to result in a wide range of textures from soft to firm.

Processing time for the method described herein is significantly shorter than conventional processes and other processes for making quick cook pastas. For example, in a preferred embodiment, the pasta dough is processed in a cold single screw extruder. The processing steps in the method may take about 7 minutes to about 45 minutes compared to hours for other processes and conventional methods. This is, in part, because the pasta dough in the invention is not, as in conventional methods, cooked in the extruder by elevated temperatures and/or pressures which require time and energy expenditures. Also, conventional processes usually employ twin screw extruders which are more costly then single screw extruders.

EXAMPLES

Example 1

A fully pre-cooked pasta was made by using a hot air toaster. A wheat flour pasta dough comprising 77% semolina and 23% water was prepared by mixing the contents using standard techniques. The pasta dough was then extruded into formed pieces of fresh pasta dough having 32% moisture content and a thickness of 0.68 millimeters using a S-25 laboratory pasta press from Demaco, Melbourne, Fla., USA equipped with a rotini die and a cutting knife. No vacuum was applied during the extrusion step. The extruded pieces as formed were steam treated at 100° C. for 3 minutes, and then placed in a water kettle and soaked for 10 minutes in water at 21° C. The soaked pasta was then transferred to a forced air cooler fitted with air blower and treated for 5 minutes to remove excess moisture from the surface of the pasta dough. After removal of excess surface moisture, the pasta dough was transferred to a laboratory hot air toaster from Wolverine Proctor and Schwartz and toasted in a single zone at 107° C. for 20 minutes with the toaster set at an air velocity of 76.2 meters per minute. After 20 minutes, the pasta pieces were removed from the toaster, and cooled to ambient temperature using the forced air cooler.

The toasted pasta was fully pre-cooked having 100% starch gelatinization as determined by the method described herein. The pasta was observed to be crispy and crunchy, unlike conventional pasta products. The pre-cooked pasta products had a slightly puffed porous internal structure with many air cells which allowed the precooked pasta to re-hydrate faster during either microwave cooking or in hot water pour-over preparation methods, both preparation methods resulting in product having typical pasta texture.

Example 2

A fully pre-cooked pasta was made by using a microwave cooking tunnel. A wheat flour pasta dough comprising 77% semolina and 23% water was prepared by mixing the contents using standard techniques. The pasta dough was then extruded into formed pieces of pasta dough having 32% moisture content and a thickness of 0.68 millimeters using a S-25 laboratory pasta press from Demaco equipped with a rotini die and a cutting knife. No vacuum was applied during the extrusion step. The extruded pieces as formed were steam treated at 100° C. for 3 minutes, and then placed in a water kettle and soaked for 10 minutes in water at 21° C. The soaked pasta was then transferred to a forced air cooler fitted with air blower and treated for 5 minutes to remove excess moisture from the surface of the pasta dough.

After removal of excess surface moisture, the pasta dough was transferred to and toasted in a three zone microwave tunnel having a frequency of 2,450 MHz, manufactured by Cober Electronics, Inc. The microwave cooking tunnel had a total active area of 3.66 meters separated into 3 power control zones. During toasting, the tunnel hot air temperature was 121° C. with an air flow velocity of from 15 to 23 meters per minute. The microwave power settings were 2.25 kW in the first zone, 0.75 kW in the second zone and the third zone had no supplied power. The total residence time of the pasta in the microwave oven was 8 to 10 minutes. After cooking, the pasta had 100% gelatinization as determined by the method described herein.

What is claimed is:

1. A process for making a pre-cooked pasta comprising the steps of a) steaming freshly extruded pasta dough for about 1 minute to about 10 minutes, b) soaking the steamed pasta dough for about 1 minute to about 20 minutes to obtain a moisture content of about 35% to about 55%, c) removing excess moisture from the surface of the pasta dough for up to about 10 minutes and d) cooking the pasta by toasting the pasta for about 2 minutes to about 30 minutes at a temperature of about 82° C. to about 177° C to obtain from about 95% to 100% starch gelatinization.

2. The process of claim 1 wherein the freshly extruded pasta has a moisture content from about 15% to about 35%.

3. The process of claim 1 wherein the toasting is conducted in one or more zones.

4. The process of claim 1 comprising the additional step of cooling the pasta by forced air after the toasting step.

5. The process of claim 1 wherein the toasting temperature is from about 93° C. to about 149° C.

6. The process of claim 1 wherein the toasting is conducted in a hot air toaster or a continuous microwave oven.

* * * * *